(12) United States Patent
Masutomi

(10) Patent No.: US 8,897,912 B2
(45) Date of Patent: Nov. 25, 2014

(54) LOADING AND UNLOADING APPARATUS AND METHOD

(71) Applicant: Kabushiki Kaisha Yaskawa Denki, Fukuoka (JP)

(72) Inventor: Shigeki Masutomi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 112 days.

(21) Appl. No.: 13/667,374

(22) Filed: Nov. 2, 2012

(65) Prior Publication Data

US 2013/0115040 A1 May 9, 2013

(30) Foreign Application Priority Data

Nov. 4, 2011 (JP) ................................. 2011-242062

(51) Int. Cl.
*G06F 7/00* (2006.01)
*B25J 9/16* (2006.01)

(52) U.S. Cl.
CPC ..... *B25J 9/1682* (2013.01); *G05B 2219/39109* (2013.01); *G05B 2219/39117* (2013.01); *G05B 2219/39135* (2013.01); *G05B 2219/40006* (2013.01)
USPC ........... 700/218; 700/213; 700/214; 700/228; 700/229; 700/230; 700/245; 700/253; 700/255

(58) Field of Classification Search
None
See application file for complete search history.

(56) References Cited

U.S. PATENT DOCUMENTS

2003/0118436 A1 *  6/2003  Kameda et al. ................ 414/799

FOREIGN PATENT DOCUMENTS

| JP | S60-178507 | 9/1985 |
| JP | S63-134183 | 6/1988 |
| JP | H05-111888 | 5/1993 |
| JP | H05-119814 | 5/1993 |
| JP | H8-305426 | 11/1996 |
| JP | 2003-191034 | 7/2003 |
| JP | 2003-192133 | 7/2003 |

OTHER PUBLICATIONS

Office Action dated Oct. 1, 2013 issued in corresponding Japanese application No. 2011-242062 and the English translation thereof.
Office Action dated Mar. 18, 2014 issued in corresponding Japanese application No. 2011-242062 and the English translation thereof.
Chinese Office Action dated Aug. 4, 2014 (w/English translation).

* cited by examiner

*Primary Examiner* — Yolanda Cumbess
(74) *Attorney, Agent, or Firm* — Bacon & Thomas, PLLC

(57) ABSTRACT

There is provided a loading and unloading apparatus for performing loading and unloading of workpieces with respect to access positions on a pallet, including a plurality of hands which sequentially access the access positions on the pallet, the plurality of hands including a first and a second hand. Further, the loading and unloading apparatus includes a managing unit which maintains an access position of the first hand, and a determining unit which determines a movement path of the second hand based on the access position of the first hand.

17 Claims, 10 Drawing Sheets

*FIG.3*

| b4 | b2 | a8 | a7 |
|----|----|----|----|
| b3 | b1 | | |
| | | a6 | a5 |
| b8 | b7 | | |
| | | a4 | a2 |
| b6 | b5 | a3 | a1 |

*FIG.4*

| b1 | a7 | a8 |
|----|----|----|
| b4 | b2 | a6 |
| b3 | a1 | a5 |
| b7 | b6 | a2 |
| b5 | a4 | a3 |

| b15 | b14 | a9 |
|-----|-----|-----|
| b13 | a10 | a12 |
| b12 | b8 | a11 |
| b9 | a14 | a15 |
| b10 | b11 | a13 |

_US 8,897,912 B2_

LOADING AND UNLOADING APPARATUS AND METHOD

CROSS-REFERENCE TO RELATED APPLICATIONS

The present disclosure contains subject matter related to that disclosed in Japanese Priority Patent Application No. 2011-242062 filed with the Japan Patent Office on Nov. 4, 2011, the entire contents of which are incorporated herein by reference.

BACKGROUND OF THE INVENTION

1. Field of the Invention

An embodiment disclosed herein relates to a loading and unloading apparatus and method.

2. Description of the Related Art

An operation of loading a workpiece such as a finished product on a pallet for storage or transport thereof is referred to as palletizing. On the other hand, an operation of unloading a workpiece such as a supply part from a pallet is referred to as depalletizing.

An apparatus performing palletizing and depalletizing (hereinafter, referred to as "loading and unloading apparatus") generally includes a robot arm. Since the robot arm transports workpieces basically by reciprocating motion, it generally has low transporting capacity compared with a machine such as a conveyor which continuously transports workpieces. For that reason, for example, if a loading and unloading apparatus including one robot arm is connected to a production line transporting workpieces by using a conveyor, a situation where the loading and unloading apparatus no longer catches up with the operation speed may occur as the pace of production becomes faster.

Accordingly, by connecting a plurality of loading and unloading apparatuses to the production line to perform loading and unloading operations in multiple locations in parallel, it is possible to cover the low transporting capacity of the loading and unloading apparatus and speed up the pace of the entire production.

There are disclosed apparatuses to improve the operation speed by allowing multiple robot hands to have access to a same pallet in, e.g., Japanese Patent Application Publication Nos. H8-305426 and 2003-191034.

SUMMARY OF THE INVENTION

In accordance with a first aspect of an embodiment disclosed herein, there is provided a loading and unloading apparatus for performing loading and unloading of workpieces with respect to access positions on a pallet, including: a plurality of hands which sequentially access the access positions on the pallet, the hands including a first and a second hand; a managing unit which maintains an access position of the first hand; and a determining unit which determines a movement path of the second hand based on the access position of the first hand.

In accordance with a second aspect of the embodiment disclosed herein, there is provided a loading and unloading method which is carried out in a loading and unloading apparatus for performing loading and unloading of workpieces with respect to access positions on a pallet, the loading and unloading apparatus including hands which sequentially access the access positions on the pallet, the hands having a first and a second hand, the method includes: obtaining an access position of a first hand; and determining a movement path of the second hand based on the access position of the first hand.

BRIEF DESCRIPTION OF THE DRAWINGS

The objects and features of an embodiment disclosed herein will become apparent from the following description thereof, given in conjunction with the accompanying drawings, in which:

FIG. 3 represents a stowage pattern A of workpieces on a pallet;

FIG. 4 depicts a stowage pattern B of workpieces on a pallet;

DETAILED DESCRIPTION OF THE EMBODIMENT

First Embodiment

A first embodiment will be described in which two robot hands have access to a same pallet, and a loading and unloading apparatus determines a movement path of one robot hand based on a position of the other robot hand on the pallet.

Figure 1:
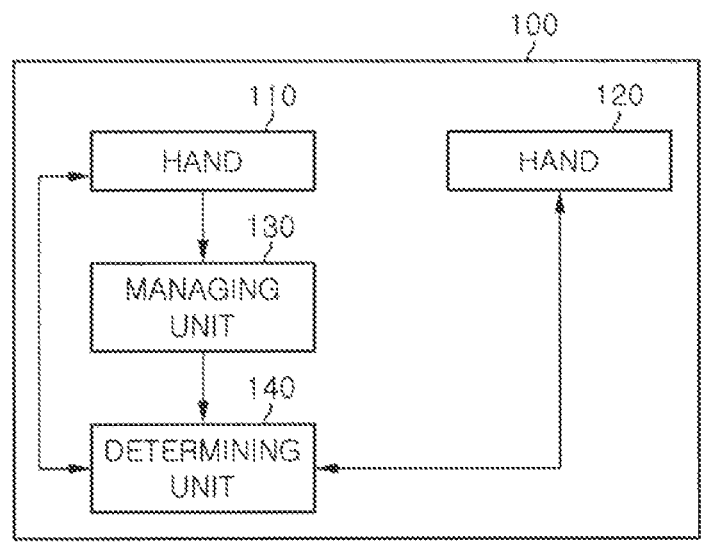
FIG. 1 is a diagram schematically showing a loading and unloading apparatus in accordance with a first embodiment.

FIG. 1 is a diagram schematically showing a loading and unloading apparatus 100 in accordance with the first embodiment. As shown in FIG. 1, the loading and unloading apparatus 100 includes hands 110 and 120, a managing unit 130 and a determining unit 140.

Figure 2:
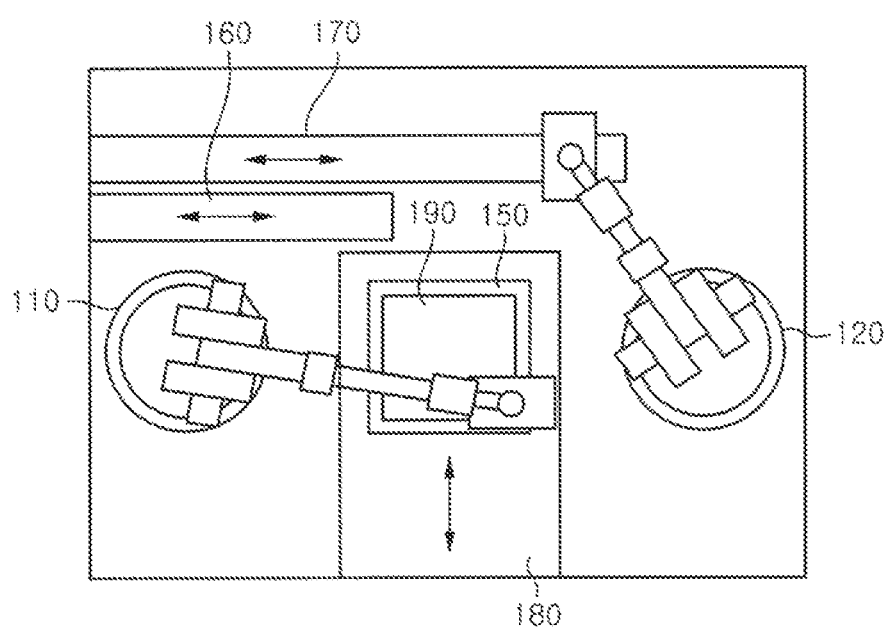
FIG. 2 is a plan view illustrating a processing layout of the first embodiment.

FIG. 2 is a plan view showing a processing layout of the first embodiment. FIG. 2 shows, in addition to the hand 110 and the hand 120 of the loading and unloading apparatus 100, a pallet storage unit 150, a workpiece conveyor 160, a workpiece conveyor 170, a pallet conveyor 180 and a pallet 190.

The loading and unloading apparatus 100 is capable of performing palletizing and depalletizing, and performs loading and unloading of workpieces at multiple access positions on the pallet 190. More specifically, the loading and unloading apparatus 100 loads the workpieces at the access positions on the pallet 190 when performing palletizing, and unloads the workpieces loaded at the access positions on the pallet 190 when performing depalletizing.

Here, the access positions refer to the positions where the workpieces are to be loaded on the empty pallet 190 when performing palletizing, and refer to the positions of the workpieces loaded on the pallet 190 when performing depalletizing.

Each of the hands 110 and 120 is a six-axis or seven-axis robot hand, and operates based on a command from the determining unit 140. Further, the hands 110 and 120 sequentially notify the determining unit 140 that the hands operate as commanded, based on outputs from encoders provided in respective axes.

Further, the hands 110 and 120 sequentially access the multiple access positions on the pallet 190 in accordance with the command from the determining unit 140.

Specifically, the hand 110 loads the workpieces from the workpiece conveyor 160 onto the access positions instructed from the determining unit 140 when palletizing. Similarly, the hand 120 loads the workpieces from the workpiece conveyor 170 onto the access positions instructed from the determining unit 140 when palletizing. Further, the hand 110 unloads the workpieces from the access positions instructed from the determining unit 140 and places the workpieces on the workpiece conveyor 160 when depalletizing. Similarly, the hand 120 unloads the workpieces from the access positions instructed from the determining unit 140 and places the workpieces on the workpiece conveyor 170 when depalletizing.

Further, the order in which the hand 110 and the hand 120 access the multiple access positions on the pallet 190 is preferably set in advance so as to reduce the opportunities for the hand 110 and the hand 120 to interfere each other as much as possible.

Figure 5:
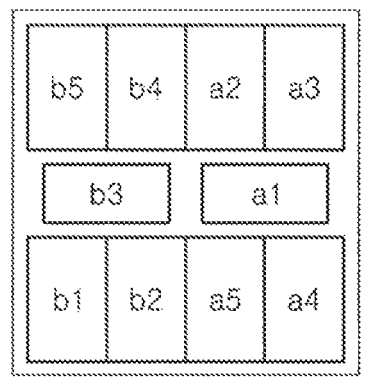
FIG. 5 shows a stowage pattern C of workpieces on a pallet.

FIGS. 3 to 5 are diagrams showing examples of stowage patterns of the workpieces on the pallet 190, and the stowage patterns are stored in, e.g., the managing unit 130. Further, the stowage patterns may be stored in the determining unit 140 or separately provided without being limited to being stored in the managing unit 130. FIGS. 3 to 5 are top views of the pallet 190, which show three types of stowage patterns A to C classified based on differences in weight and shape of the workpieces. Further, the numbers indicating the access order are attached to the access positions of the stowage patterns A to C shown in FIGS. 3 to 5. Furthermore, in principle, the hand 110 and the hand 120 are alternately operated to perform the loading and unloading of the workpieces in the access order of, e.g., a1, b1, a2, b2, .... In the present embodiment, since the stowage patterns are provided in advance such that the access positions of the hands are managed, it is possible to palletize workpieces in the order of arrival, or depalletize them in the order of production.

In the stowage pattern A shown in FIG. 3, the access positions of the hand 120 are a1 to a8, and the access positions of the hand 110 are b1 to b8. Further, the hand 110 and the hand 120 alternately perform the loading and unloading of the workpieces in the order of a1, b1, a2, b2, a3, b3, a4, b4, a5, b5, a6, b6, a7, b7, a8, and b8.

In the stowage pattern B shown in FIG. 4, which shows an access order of two palettes pallets, the access positions of the hand 110 are a1 to a15, and the access positions of the hand 120 are b1 to b15. In the first pallet, the hand 110 and the hand 120 alternately perform the loading and unloading of the workpieces in the order of a1, b1, a2, b2, a3, b3, a4, b4, a5, b5, a6, b6, a7, b7, and a8. In the second pallet, the hand 110 and the hand 120 alternately perform the loading and unloading of the workpieces in the order of b8, a9, b9, a10, b10, a11, b11, a12, b12, a13, b13, a14, b14, a15, and b15.

In the stowage pattern B, the number of the access positions on one pallet is odd. Therefore, when the hand 110 and the hand 120 operate alternately, the operation order of the hand 110 and the hand 120 is reversed every pallet.

In the stowage pattern C shown in FIG. 5, the access positions of the hand 110 are a1 to a5, and the access positions of the hand 120 are b1 to b5. The hand 110 and the hand 120 alternately perform the loading and unloading of the workpieces in the order of a1, b1, a2, b2, a3, b3, a4, b4, a5, and b5.

The managing unit 130 manages the access positions of the hand 110 in accordance with the stored stowage patterns. For example, when performing the loading and unloading of the workpieces in the order of the stowage pattern A shown in FIG. 3, the managing unit 130 maintains any one of the access positions b1 to b8 shown in FIG. 3 with respect to the hand 110.

The determining unit 140 obtains the access position of the hand 110 from the managing unit 130 and determines the movement path of the hand 120 based on the obtained access position. To describe in detail, based on the access position of the hand 110 which has just accessed the pallet 190, the determining unit 140 diverts the movement path of the hand 120 if the movement path of the hand 110 overlaps the movement path of the hand 120 which moves toward the access position on the pallet 190 from the workpiece conveyor 170. Alternatively, based on the access position of the hand 110 which accesses the pallet 190 in succession, the determining unit 140 diverts the movement path of the hand 120 if the movement path of the hand 110 overlaps the movement path of the hand 120 which moves toward the workpiece conveyor 170 from the access position on the pallet 190.

Figure 6:
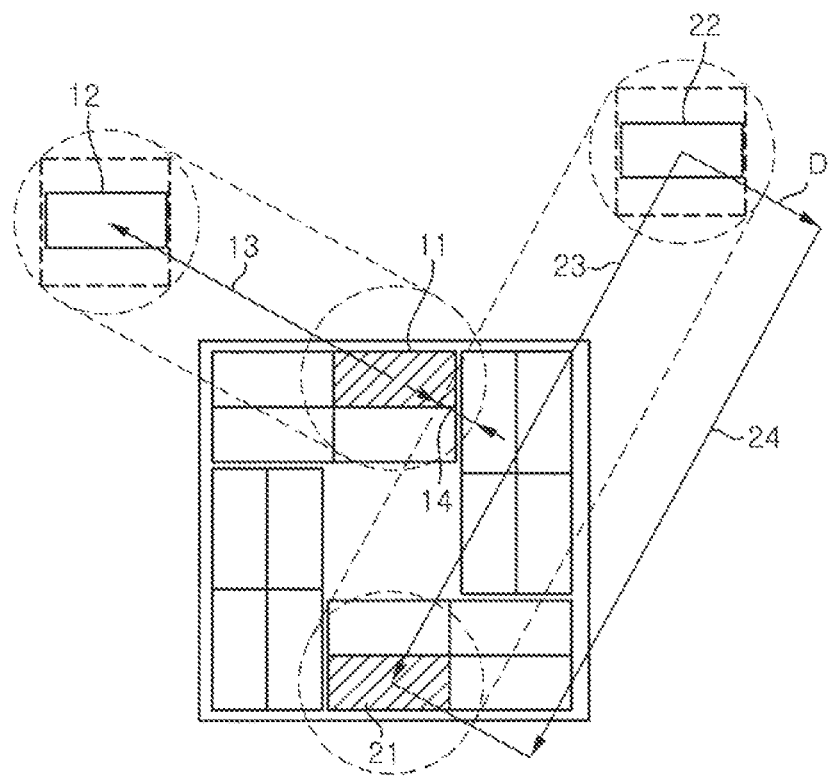
FIG. 6 is a diagram for explaining an overview of how to divert a movement path of a hand.

FIG. 6 is a diagram for explaining an overview of how to divert the movement path of the hand 120. A method in which the determining unit 140 determines the movement path of the hand 120 will be described below.

FIG. 6 shows a case where the hand 110 accesses an access position 11 (shaded area in FIG. 6 corresponding to the access position b2 of FIG. 3) and then the hand 120 accesses an access position 21 (shaded area in FIG. 6 corresponding to the access position a3 of FIG. 3) in the stowage pattern A.

Further, FIG. 6 shows a workpiece position 22 on the workpiece conveyor 170 and a workpiece position 12 on the workpiece conveyor 160. In this case, a dashed rectangle surrounding the workpiece position 12 or workpiece position 22 indicates a contour of a head portion of the hand 110 or hand 120. Also, a dashed circle surrounding each of the access position 11, workpiece position 12, access position 21 and workpiece position 22 indicates a range in which the head portion of the hand 110 or hand 120 is rotated at each position.

In FIG. 6, the determining unit 140 calculates a shortest movement path 13 of the head portion of the hand 110 from the access position 11 of the hand 110 and the workpiece position 12 on the workpiece conveyor 160. Further, the determining unit 140 calculates a detour movement path 24 of the hand 120 to divert the path of the hand 120 in a direction to make the path stay away from the movement direction of the calculated shortest movement path 13 of the hand 110 based on a shortest movement path 23 of the hand 120.

Further, a distance D by which the movement path is diverted by the determining unit 140 may be a fixed value, or may be appropriately changed depending on the access position of the hand 110.

Further, the distance D by which the movement path is diverted by the determining unit 140 may be a distance 14 within which there is a possibility that the hand 110 and the hand 120 make a contact with each other when they perform the loading and unloading through the shortest movement path 13 and the shortest movement path 23, respectively.

Further, the direction of the detour by the determining unit 140 may be a fixed direction, or may be appropriately changed depending on the access position of the hand 110.

The determining unit 140 may divert the movement path of the hand 120 based on the access position of the hand 110 if the hand 110 has not completed the operation of accessing the pallet 190 yet, and may not divert the movement path of the hand 120 if the hand 110 has completed the operation of accessing the pallet 190. Herein, it may be determined that the accessing operation has been completed when the moving range of the head portion of the hand is deviated from the access position of the hand or the position above the pallet.

Further, in FIG. 6, the determining unit 140 determines the movement path of the hand 120 to move toward the access position thereof based on the access position of the hand 110 which has just accessed the pallet 190. However, the determining unit 140 may determine the movement path of the hand 120 to move away from the access position based on the access position of the hand 110 which accesses the pallet 190 in succession. To be specific, the determining unit 140 calculates the shortest movement path through which the hand 110 moves from the workpiece position on the workpiece conveyor 160 toward the access position on the pallet 190 as shown in FIG. 6, based on the workpiece position on the workpiece conveyor 160 and the access position of the hand 110 which accesses the pallet 190 in succession. Then, the determining unit 140 diverts the movement path of the hand 120 in a direction to make the path stay away from the calculated shortest movement path if the movement path of the hand 120 which moves away from the access position on the pallet 190 overlaps the calculated shortest movement path of the hand 110.

The determining unit 140 may divert the movement path of the hand 120 based on the access position of the hand 110 if the hand 110 which accesses the pallet 190 in succession is on standby, and may not divert the movement path of the hand 120 if the hand 110 which accesses the pallet 190 in succession is not on standby.

The determining unit 140 may divert both the movement path of the hand 120 which moves toward the access position and the movement path of the hand 120 which moves away from the access position on the pallet 190.

Further, the determining unit 140 determines both operations of the hand 110 and the hand 120 and sends the operation instructions to the hand 110 and the hand 120 while monitoring the hand 110 and the hand 120 such that the hand 110 and the hand 120 do not make a contact with each other by a single control using the same logic circuit and program.

The determining unit 140 compares the path of the hand 110 from the current position to the estimated position with the path of the hand 120 from the current position to the estimated position, and instructs the hand 110 and the hand 120 to simultaneously move if a region where the hand 110 is likely to be present does not overlap a region where the hand 120 is likely to be present. While operating the hand 110 and the hand 120, the determining unit 140 stops the operation of one hand to be performed later and gives priority to the operation of the other hand if the region where the hand 110 is likely to be present overlaps the region where the hand 120 is likely to be present. If it is impossible to operate the other hand even though the operation of one hand is stopped, the stopped hand is moved in a direction away from the movement path of the other hand.

For example, when palletizing in the stowage pattern A of FIG. 3, the determining unit 140 alternately instructs the hand 110 and the hand 120 such that the hand 120 loads the workpieces by having access to the access positions in the order of a1-a8, and the hand 110 loads the workpieces by having access to the access positions in the order of b1-b8.

Further, the managing unit 130 may mange manage the access positions of the hand 120 as well as the access positions of the hand 110.

The determining unit 140 may not only determine the movement path of the hand 120 based on the access position of the hand 110 being managed by the managing unit 130, but also determine the movement path of the hand 110 based on the access position of the hand 120 being managed by the managing unit 130.

As described above, in the loading and unloading apparatus and method of the first embodiment, since the movement path of a second hand can be determined based on the access position of a first hand, the first hand can perform the loading and unloading by using the detour movement path which does not make a contact with the second hand with reference to the access position of the second hand, i.e., the movement path of good work efficiency.

Therefore, in the loading and unloading apparatus having a configuration to perform the loading and unloading by using multiple robot hands with respect to the same pallet, it is possible to improve the operation speed while preventing any contact between the robot hands.

In the first embodiment, the loading and unloading apparatus capable of palletizing and depalletizing has been described. Hereinafter, the more specific configuration and control method will be described by separating a depalletizing apparatus (first modification example) from a palletizing apparatus (second modification example).

First Modification Example

The first modification example illustrates, in the configuration in which two robot hands are allowed to have access to the same pallet, a depalletizing apparatus which diverts the movement path of the robot hand which secondly accesses the pallet when it moves toward the access position on the pallet, based on the access position (on the pallet) of the robot hand which firstly accesses the pallet.

Figure 7:
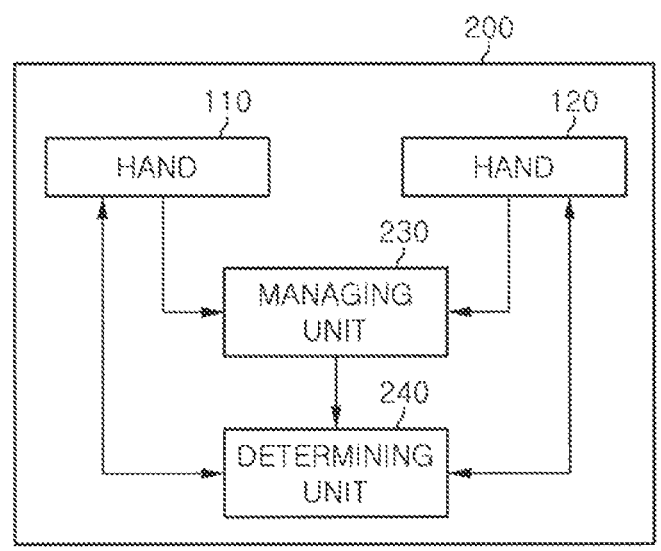
FIG. 7 is a diagram schematically showing a depalletizing apparatus in accordance with a first modification example.

FIG. 7 schematically shows a depalletizing apparatus 200 in accordance with the first modification example. As shown in FIG. 7, the depalletizing apparatus 200 includes the hands 110 and 120, a managing unit 230 and a determining unit 240.

Further, in the depalletizing apparatus 200 in accordance with the first modification example, the same components as those of the loading and unloading apparatus 100 of the first embodiment are denoted by the same reference numerals, and a description thereof will be omitted. A diagram showing a processing layout of the depalletizing apparatus 200 is the same as that of the first embodiment shown in FIG. 2.

The depalletizing apparatus 200 is capable of performing depalletizing, and unloads the workpieces loaded on the pallet 190.

The hand 110 and the hand 120 sequentially access the multiple access positions on the pallet 190 in accordance with the command from the determining unit 240.

Specifically, the hand 110 unloads a workpiece from an access position instructed from the determining unit 240 and places the workpiece on the workpiece conveyor 160. Similarly, the hand 120 unloads a workpiece from an access position instructed from the determining unit 240 and places the workpiece on the workpiece conveyor 170.

The managing unit 230 stores stowage patterns related to the access positions of the hand 110 and the access positions of the hand 120, and manages the access positions of the hand 110 and the hand 120. For example, when performing the loading and unloading of the workpieces in the order of the stowage pattern A shown in FIG. 3, the managing unit 230 maintains any one of the access positions a1 to a8 for the hand 120, any one of the access positions b1 to b8 for the hand 110, and outputs it to the determining unit 240.

The determining unit 240 determines the movement path of the hand 120 based on the access position of the hand 110 obtained from the managing unit 230, and determines the movement path of the hand 110 based on the access position of the hand 120 obtained from the managing unit 230. To describe in detail, if the movement path of the hand 120 moves toward the access position on the pallet 190 from the workpiece conveyor 170 overlaps the movement path of the hand 110 which has accessed the pallet 190, the determining unit 240 diverts the movement path of the hand 120 based on the access position of the hand 110. Further, if the movement path of the hand 110 which moves toward the access position on the pallet 190 from the workpiece conveyor 160 overlaps the movement path of the hand 120 which has accessed the pallet 190, the determining unit 240 diverts the movement path of the hand 110 based on the access position of the hand 120.

Here, a method where the determining unit 240 determines the movement paths of the hand 110 and the hand 120 is the same as the method where the determining unit 140 determines the movement path of the hand 120 in the first embodiment.

As in the first embodiment, the determining unit 240 determines both operations of the hand 110 and the hand 120 and sends the operation instructions to the hand 110 and the hand 120 while monitoring the hand 110 and the hand 120 such that the hand 110 and the hand 120 do not make a contact with each other by a single control using the same logic circuit and program.

Figure 8A:
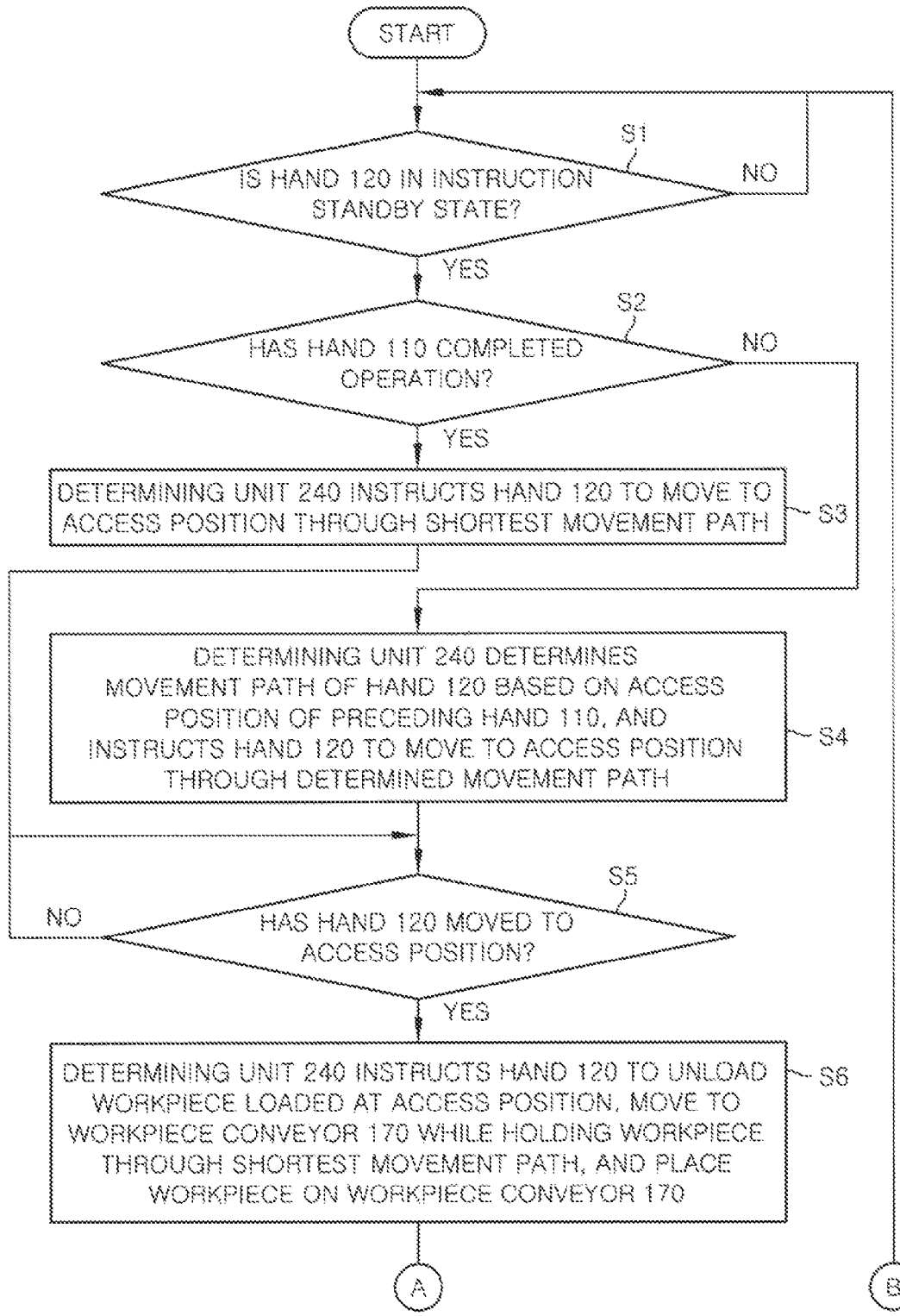
FIGS. 8A and 8B are flowcharts illustrating an overview of a depalletizing process.
Figure 8B:
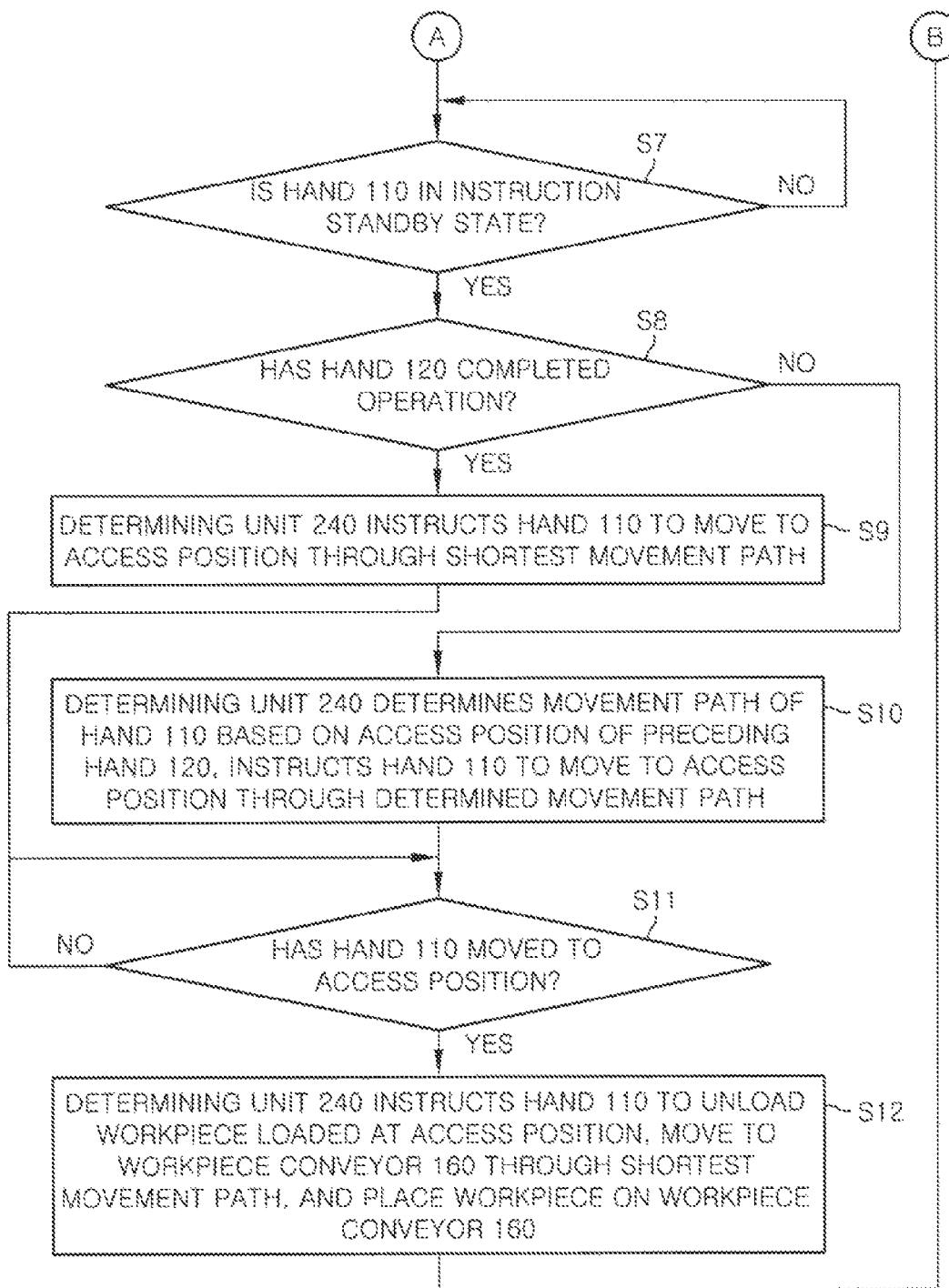

Hereinafter, a detailed operation of the depalletizing apparatus 200 shown in FIG. 7 will be described with reference to the drawings. FIGS. 8A and 8B are flowcharts showing an overview of a depalletizing process. An overview of the depalletizing process will be described with reference to FIGS. 2, 7, 8A and 8B.

(1) The determining unit 240 determines whether or not the hand 120 is in an instruction standby state on the workpiece conveyor 170 (step S1). That is, the determining unit 240 waits until the hand 120 goes into the instruction standby state. In this case, the hand 120 goes into the instruction standby state after placing the workpiece on the workpiece conveyor 170 or an initial state.

(2) If the hand 120 is in the instruction standby state (step S1: YES), the determining unit 240 determines whether or not the hand 110 has completed the operation of unloading the workpiece from the access position (step S2). Herein, the determining unit 240 may determine that the operation has been completed, for example, if the moving range of the head portion of the hand 110 is deviated from the position above the pallet, or if the moving range of the head portion of the hand 110 does not overlap the movement path of the head portion of the hand 120.

(3) If the operation of the hand 110 has been completed (step S2: YES), the determining unit 240 instructs the hand 120 to move to the access position through the shortest movement path thereof (step S3).

(4) If the operation of the hand 110 has not been completed (step S2: NO), the determining unit 240 determines the movement path of the hand 120 based on the access position of the preceding hand 110. Further, the determining unit 240 instructs the hand 120 to move toward the access position through the determined movement path (step S4).

In this case, the determining unit 240 determines the movement path of the hand 120 based on the access position of the hand 110 while monitoring the hand 110 and the hand 120 such that the hand 110 and the hand 120 do not make a contact with each other. That is, if the region where the hand 110 is likely to be present overlaps the region where the hand 120 is likely to be present, the determining unit 240 gives priority to the operation of the hand 110 which has accessed the pallet 190, and diverts the movement of the hand 120.

(5) The determining unit 240 determines whether or not the hand 120 has moved to the access position. Then, the determining unit 240 waits until the hand 120 arrives at the access position (step S5).

(6) If the hand 120 arrives at the access position (step S5: YES), the determining unit 240 instructs the hand 120 to lift the workpiece loaded at the access position, move to the workpiece conveyor 170 through the shortest movement path while holding the workpiece, and put it down on the workpiece conveyor 170 (step S6).

In this case, the determining unit 240 instructs the hand 110 and the hand 120 to operate while monitoring the hand 110 and the hand 120 such that the hand 110 and the hand 120 do not make a contact with each other. If the region where the hand 110 is likely to be present overlaps the region where the hand 120 is likely to be present, the determining unit 240 gives priority to the operation of the hand 110 which accesses the pallet 190 earlier, and holds (e.g., stops) the operation of the hand 120 and then resumes the operation of the hand 120 when the accessing operation of the hand 110 has been completed.

(7) The determining unit 240 determines whether or not the hand 110 is in the instruction standby state at the workpiece conveyor 160. Further, the determining unit 240 waits until the hand 110 goes into the instruction standby state (step S7). In this case, the hand 110 goes into the instruction standby state after placing the workpiece on the workpiece conveyor 160 or an initial state.

(8) If the hand 110 is in the instruction standby state (step S7: YES), the determining unit 240 determines whether or not the hand 120 has completed the operation of unloading the workpiece from the access position (step S8).

(9) If the operation of the hand 120 has been completed (step S8: YES), the determining unit 240 instructs the hand 110 to move through the shortest movement path to the access position (step S9).

(10) If the operation of the hand 120 has not been completed (step S8: NO), the determining unit 240 determines the movement path of the hand 110 based on the access position of the hand 120. Further, the determining unit 240 instructs the hand 110 to move through the determined movement path toward the access position thereof (step S10).

In this case, the determining unit 240 determines the movement path of the hand 110 based on the access position of the hand 120 while monitoring the hand 110 and the hand 120 such that the hand 110 and the hand 120 do not make a contact with each other. That is, if the region where the hand 110 is likely to be present overlaps the region where the hand 120 is likely to be present, the determining unit 240 gives priority to the operation of the hand 120 which accesses the pallet 190 earlier, and diverts the movement of the hand 110.

(11) The determining unit 240 determines whether the hand 110 has moved to the access position. Then, the determining unit 240 waits until the hand 110 arrives at the access position (step S11).

(12) If the hand 110 has moved to the access position (step S11: YES), the determining unit 240 instructs the hand 110 to pick up the workpiece loaded at the access position, move to the workpiece conveyor 160 through the shortest movement path while holding the workpiece, and place the workpiece on the workpiece conveyor 160 (step S12).

In this case, the determining unit 240 instructs the hand 110 and the hand 120 to operate while monitoring the hand 110 and the hand 120 such that the hand 110 and the hand 120 do not make a contact with each other. If the region where the hand 110 is likely to be present overlaps the region where the hand 120 is likely to be present, the determining unit 240 gives priority to the operation of the hand 120 which accesses the pallet 190 earlier, and holds (e.g., stops) the operation of the hand 110 and then resumes the operation of the hand 110 when the accessing operation of the hand 120 has been completed.

Since the depalletizing apparatus performs the unloading of the workpieces, the robot hand does not hold the workpiece while moving toward the access position, and the robot hand holds the workpiece when it is moving away from the access position. Due to the weight of the workpiece, it is more difficult to increase the moving speed of the robot hand when the robot hand holds the workpiece than when it does not. Further, when the robot hand holds the workpiece, an auxiliary operation for control or standby time may be additionally inserted to prevent the workpiece from being dropped or dislocated. Accordingly, in the depalletizing apparatus, the moving speed of the robot hand when moving toward the access position can be higher than the moving speed of the robot hand when moving away from the access position.

With the depalletizing apparatus of the first modification example, since it diverts only the movement path of the robot hand which does not hold the workpiece, it is possible to cancel out an increase in movement distance due to the detour by increasing the moving speed.

Second Modification Example

The second modification example illustrates, in the configuration in which two robot hands have access to the same pallet, a palletizing apparatus which diverts the movement path of the robot hand which firstly accesses the pallet, to move away from the access position on the pallet based on the operation position (on the pallet) of the robot hand which secondly accesses the pallet.

Figure 9:
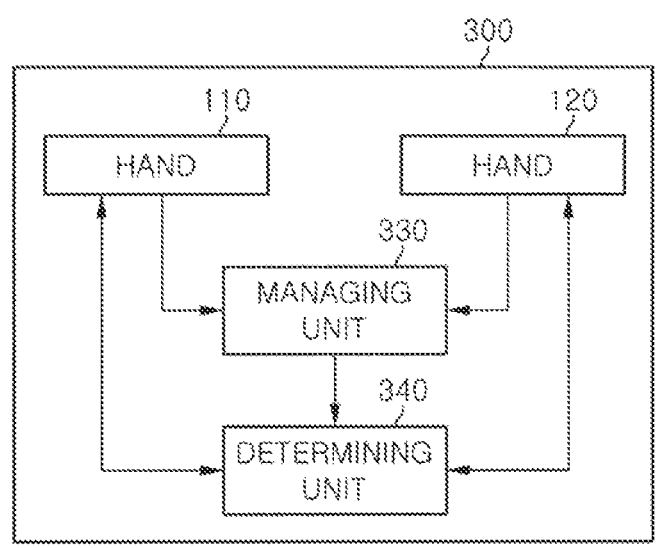
FIG. 9 is a diagram schematically representing a palletizing apparatus in accordance with a second modification example.

FIG. 9 is a diagram schematically showing a palletizing apparatus 300 in accordance with the second modification example. As shown in FIG. 9, the palletizing apparatus 300 includes the hands 110 and 120, a managing unit 330 and a determining unit 340.

Further, in the palletizing apparatus 300 in accordance with the second modification example, the same components as those of the loading and unloading apparatus 100 in accordance with the first embodiment are denoted by the same reference numerals, and a description thereof will be omitted. A diagram showing a processing layout of the palletizing apparatus 300 is the same as that of the first embodiment shown in FIG. 2.

The palletizing apparatus 300 is capable of performing palletizing, and loads the workpieces on the empty pallet 190.

The hand 110 and the hand 120 sequentially access the multiple access positions on the pallet 190 in accordance with the commands from the determining unit 340.

Specifically, the hand 110 loads the workpieces from the workpiece conveyor 160 onto the access positions instructed from the determining unit 340. Similarly, the hand 120 loads the workpieces from the workpiece conveyor 170 onto the access positions instructed from the determining unit 340.

The function of the managing unit 330 is the same as that of the managing unit 230 of the first modification example.

The determining unit 340 determines the movement path of the hand 120 based on the access position of the hand 110 obtained from the managing unit 330, and determines the movement path of the hand 110 based on the access position of the hand 120 obtained from the managing unit 330. Specifically, if the movement path of the hand 110 overlaps the movement path of the hand 120 which moves toward the workpiece conveyor 170 from the access position on the pallet 190, the determining unit 340 diverts the movement path of the hand 120 based on the access position of the hand 110 which accesses the pallet 190 in succession. Further, if the movement path of the hand 120 overlaps the movement path of the hand 110 which moves toward the workpiece conveyor 160 from the access position on the pallet 190, the determining unit 340 diverts the movement path of the hand 110 based on the access position of the hand 120 which accesses the pallet 190 in succession.

Here, a method in which the determining unit 340 determines the movement paths of the hand 110 and the hand 120 is the same as the method in which the determining unit 140 determines the movement path of the hand 120 in the first embodiment.

Further, as in the first embodiment, the determining unit 340 determines both operations of the hand 110 and the hand 120 and instructs the hand 110 and the hand 120 to operate while monitoring the hand 110 and the hand 120 such that the hand 110 and the hand 120 do not make a contact with each other by a single control using the same logic circuit and program.

Figure 10A:
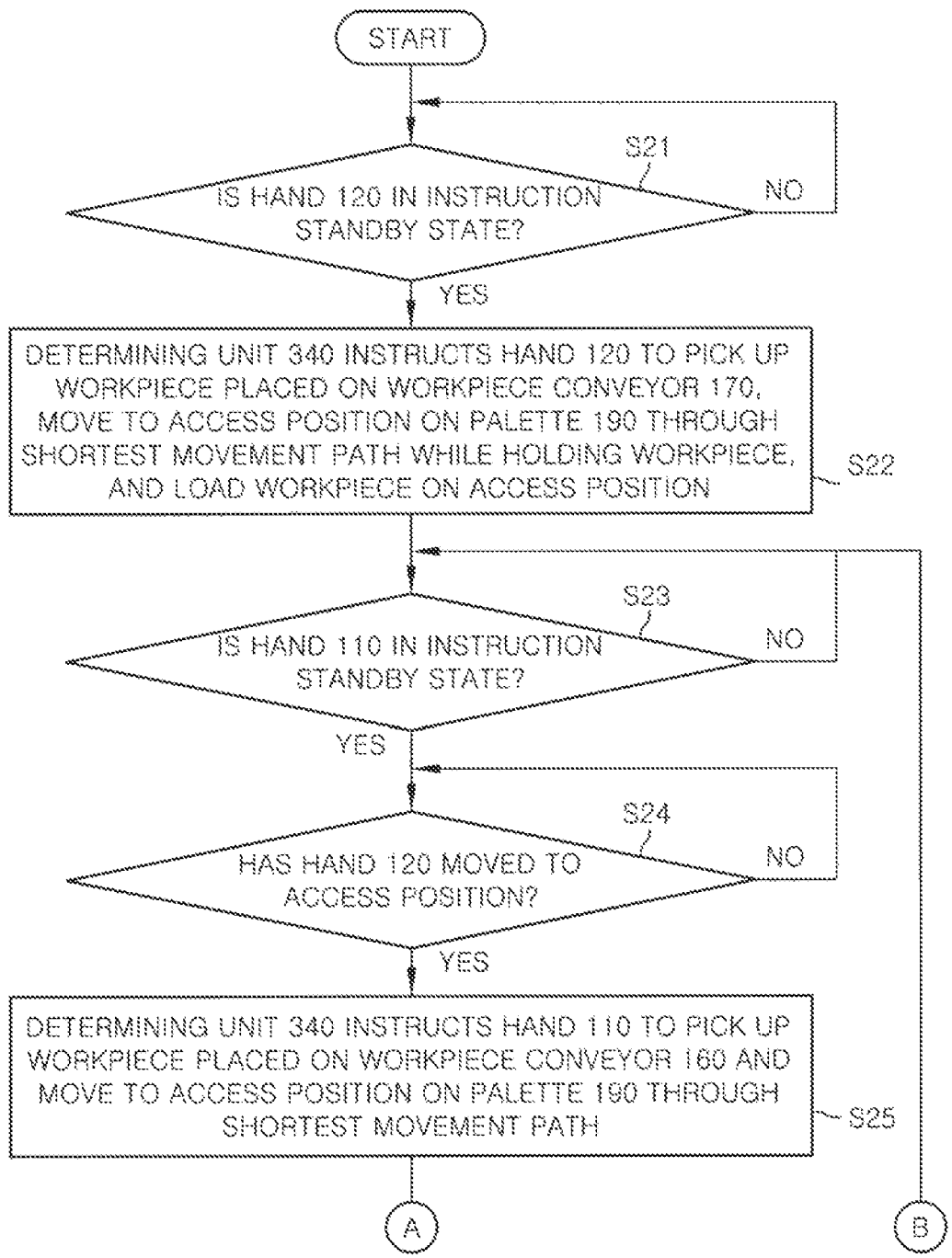
FIGS. 10A to 10C are flowcharts showing an overview of a depalletizing process.
Figure 10B:
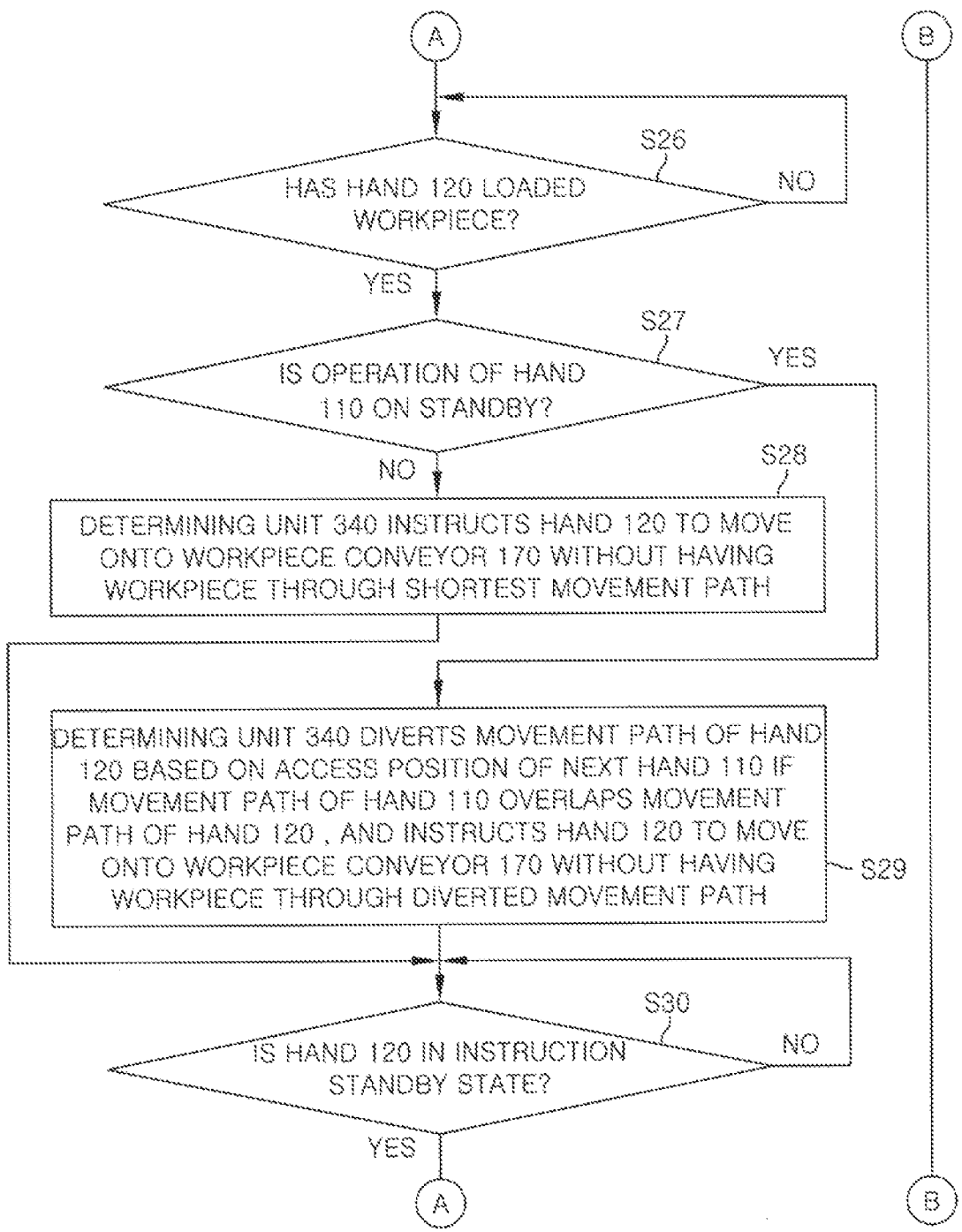
Figure 10C:
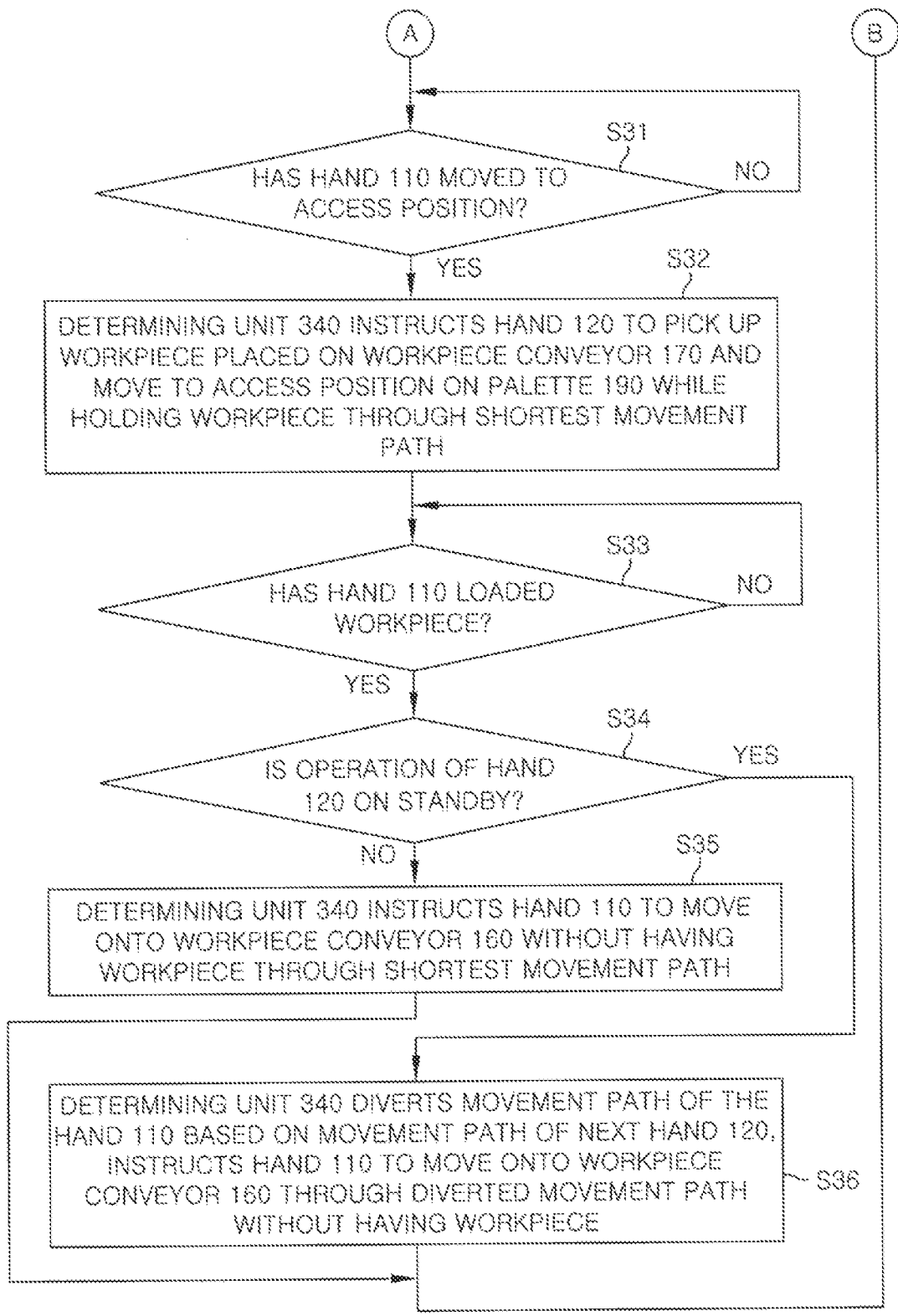

Next, an operation of the palletizing apparatus 300 shown in FIG. 9 will be described. FIGS. 10A to 10C are flowcharts showing an overview of a palletizing process. Hereinafter, an overview of the palletizing process will be described with reference to FIGS. 2, 9, and 10A to 10C.

(1) The determining unit 340 determines whether or not the hand 120 is in an instruction standby state at the workpiece conveyor 170. Then, the determining unit 340 waits until the hand 120 is in the instruction standby state (step S21). In this case, the hand 120 goes into the instruction standby state after moving onto the workpiece conveyor 170 or an initial state.

(2) If the hand 120 is in the instruction standby state (step S21: YES), the determining unit 340 instructs the hand 120 to pick up the workpiece placed on the workpiece conveyor 170, move to the access position on the pallet 190 through the shortest movement path while holding the workpiece, and load the workpiece on the access position (step S22).

(3) The determining unit 340 determines whether or not the hand 110 is in an instruction standby state at the workpiece conveyor 160. Then, the determining unit 340 waits until the hand 110 goes into the instruction standby state (step S23). In this case, the hand 110 goes into the instruction standby state after moving onto the workpiece conveyor 160 or an initial state.

(4) If the hand 110 is in the instruction standby state (step S23: YES), the determining unit 340 determines whether or not the hand 120 has moved to the access position. Then, the determining unit 340 waits until the hand 120 arrives at the access position (step S24).

(5) If the hand 120 has arrived at the access position (step S24: YES), the determining unit 340 instructs the hand 110 to pick up the workpiece placed on the workpiece conveyor 160 and move to the access position on the pallet 190 through the shortest movement path while holding the workpiece (step S25).

In this case, the determining unit 340 instructs the hand 110 and the hand 120 to operate while monitoring the hand 110 and the hand 120 such that they do not make a contact with each other. If the region where the hand 110 is likely to be present overlaps the region where the hand 120 is likely to be present, the determining unit 340 holds the operation of the hand 110 which accesses the pallet 190 in succession.

(6) The determining unit 340 determines whether or not the hand 120 has loaded the workpiece. Then, the determining unit 340 waits until the hand 120 has loaded the workpiece at the access position (step S26).

(7) If the hand 120 has loaded the workpiece (step S26: YES), the determining unit 340 determines whether or not an operation of the next hand 110 which moves to the access position is on standby (step S27).

(8) If an operation of the hand 110 is not on standby (step S27: NO), the determining unit 340 instructs the hand 120 to move onto the workpiece conveyor 170 without having the workpiece through the shortest movement path (step S28).

(9) If the operation of the hand 110 is on standby (step S27: YES) and if the movement path of the next hand 110 overlaps the movement path of the hand 120, the determining unit 340 diverts the movement path of the hand 120 based on the access position of the next hand 110. Further, the determining unit 340 instructs the hand 120 to move onto the workpiece conveyor 170 through the diverted path without having the workpiece (step S29).

In this case, the determining unit 340 determines the movement paths of the hand 110 and the hand 120 such that the hand 110 and the hand 120 do not make a contact with each other while monitoring the hand 110 and the hand 120. If the region where the hand 110 is likely to be present overlaps the region where the hand 120 is likely to be present, the determining unit 340 diverts the movement path of the hand 120 based on the movement path of the operation of the hand 110 which accesses the pallet 190 later.

(10) The determining unit 340 determines whether or not the hand 120 is in the instruction standby state at the workpiece conveyor 170. Then, the determining unit 340 waits until the hand 120 goes into the instruction standby state (step S30).

(11) If the hand 120 is in the instruction standby state (step S30: YES), the determining unit 340 determines whether or not the hand 110 has moved to the access position. Then, the determining unit 340 waits until the hand 110 has moved onto the access position (step S31).

(12) If the hand 110 has moved to the access position (step S31: YES), the determining unit 340 instructs the hand 120 to pick up the workpiece placed on the workpiece conveyor 170 and move onto the access position on the pallet 190 through the shortest movement path while holding the workpiece (step S32).

In this case, the determining unit 340 instructs the hand 110 and the hand 120 to operate while monitoring the hand 110 and the hand 120 such that they do not make a contact with each other. If the region where the hand 110 is likely to be present overlaps the region where the hand 120 is likely to be present, the determining unit 340 holds the operation of the next hand 120 which accesses the pallet 190, and then resumes the operation of the hand 120 when the preceding hand 110 has moved to the access position.

(13) The determining unit 340 determines whether or not the hand 110 has loaded the workpiece. Then, the determining unit 340 waits until the hand 110 has loaded the workpiece onto the access position (step S33).

(14) If the hand 110 has loaded the workpiece (step S33: YES), the determining unit 340 determines whether or not an operation of the next hand 120 which moves to the access position is on standby (step S34).

(15) If an operation of the next hand 120 is not on standby (step S34: NO), the determining unit 340 instructs the hand 110 to move onto the workpiece conveyor 160 through the shortest movement path without having the workpiece (step S35).

(16) If the operation of the next hand 120 is on standby (step S34: YES), the determining unit 340 determines the movement path of the hand 110 based on the access position of the next hand 120. Further, the determining unit 340 instructs the hand 110 to move onto the workpiece conveyor 160 through the determined movement path without having the workpiece (step S36).

In this case, the determining unit 340 determines the movement path of the hand 110 based on the access position of the next hand 120 such that the hand 110 and the hand 120 do not make a contact with each other while monitoring the hand 110 and the hand 120. If the region where the hand 110 is likely to be present overlaps the region where the hand 120 is likely to be present, the determining unit 340 diverts the movement path of the hand 110 based on the movement path of the next hand 120 which accesses the pallet 190.

Although two robot hands are allowed to have access to the same pallet in the first embodiment, the first modification example, and the second modification example, three or more robot hands may be used.

Since the palletizing apparatus performs the loading of the workpieces, the robot hand holds the workpiece while moving toward the access position, and does not hold the workpiece while moving away from the access position. Due to the weight of the workpiece, it is more difficult to increase the moving speed of the robot hand when the robot hand holds the workpiece than when the robot hand does not hold the workpiece. Further, when the robot hand has the workpiece, an auxiliary operation for braking or standby time may be additionally set to prevent the workpiece from being dropped or dislocated. Accordingly, in the palletizing apparatus, the moving speed of the robot hand when moving away from the access position can be higher than the moving speed of the robot hand when moving toward the access position.

With the palletizing apparatus of the second modification example, since it diverts only the movement path of the robot hand which does not hold the workpiece, it is possible to cancel out an increase in movement distance due to the detour by increasing the moving speed.

The embodiment disclosed herein can be applied to all loading and unloading apparatuses which perform palletizing and depalletizing.

With the above-described embodiment and modification examples, since the movement path of the first hand can be determined based on the access position of the second hand in the loading and unloading apparatus which performs the loading and unloading operation with respect to the same pallet by using multiple robot hands, it is possible to improve the operation speed while preventing the contact between the robot hands. Further, it is possible to speed up the pace of the entire production by improving the operation speed of the loading and unloading apparatus while palletizing finished products in the order of production and shipping, or depalletizing supply parts in the order of arrival and putting into a production line, thereby achieving extremely high industrial value.

It should be understood by those skilled in the art that various modifications, combinations, sub-combinations and alterations may occur depending on design requirements and other factors insofar as they are within the scope of the appended claims or the equivalents thereof.

The invention claimed is:

1. A loading/unloading apparatus for performing loading/unloading of workpieces with respect to access positions on a pallet, comprising:

a plurality of hands including a first and a second hand which alternately access the access positions on the pallet, the access positions comprising access positions of each of the first and the second hand;

a managing unit which manages the access positions of each of the first and the second hand, wherein an access order of the first hand is set to the access positions of the first hand and an access order of the second hand is set to the access positions of the second hand; and a determining unit which determines a movement path of the second hand based on one of the access positions of the first hand, wherein the access positions and the access order of one of the first and the second hand are determined based on the access positions and the access order of the other one of the first and the second hand.

2. The loading/unloading apparatus of claim 1, wherein the determining unit determines the movement path of the second hand based on an access position of the first hand which the first hand accesses before the second hand accesses the pallet.

3. The loading/unloading apparatus of claim 2, wherein, if the first hand has not completed an accessing operation with respect to the access position of the first hand and if a movement path of the first hand overlaps the movement path of the second hand, the determining unit diverts the movement path of the second hand based on the access position of the first hand; and, if the first hand has completed the accessing operation, the determining unit does not divert the movement path of the second hand.

4. The loading/unloading apparatus of claim 3, wherein the loading/unloading apparatus is a depalletizing apparatus which unloads the workpieces loaded at the access positions on the pallet.

5. The loading/unloading apparatus of claim 3, wherein the determining unit further determines a movement path of the first hand based on one of the access positions of the second hand.

6. The loading/unloading apparatus of claim 2, wherein the loading/unloading apparatus is a depalletizing apparatus which unloads the workpieces loaded at the access positions on the pallet.

7. The loading/unloading apparatus of claim 2, wherein the determining unit further determines a movement path of the first hand based on one of the access positions of the second hand.

8. The loading/unloading apparatus of claim 1, wherein the loading/unloading apparatus is a depalletizing apparatus which unloads the workpieces loaded at the access positions on the pallet.

9. The loading/unloading apparatus of claim 1, wherein the number of the plurality of hands is two, and the determining unit further determines a movement path of the first hand based on one of the access positions of the second hand.

10. The loading/unloading apparatus of claim 1, wherein the determining unit determines the movement path of the second hand based on an access position of the first hand which the first hand accesses after the second hand accesses the pallet.

11. The loading/unloading apparatus of claim 10, wherein the loading/unloading apparatus is a palletizing apparatus which loads the workpieces at the access positions on the pallet.

12. The loading/unloading apparatus of claim 10, wherein the determining unit further determines a movement path of the first hand based on one of the access positions of the second hand.

13. The loading/unloading apparatus of claim 10, wherein, if the first hand which is to access the access position of the first hand in succession is on standby and if a movement path of the first hand overlaps the movement path of the second hand, the determining unit diverts the movement path of the second hand based on the access position of the first hand; and, if the first hand which is to access the access position in succession is not on standby, the determining unit does not divert the movement path of the second hand.

14. The loading/unloading apparatus of claim 13, wherein the loading/unloading apparatus is a palletizing apparatus which loads the workpieces at the access positions on the pallet.

15. The loading/unloading apparatus of claim 13, wherein the determining unit further determines a movement path of the first hand based on one of the access positions of the second hand.

16. The loading/unloading apparatus of claim 1, wherein the loading/unloading apparatus is a palletizing apparatus which loads the workpieces at the access positions on the pallet.

17. A loading/unloading method which is carried out in a loading/unloading apparatus for performing loading/unloading of workpieces with respect to access positions on a pallet, the loading/unloading apparatus including hands which alternately access the access positions on the pallet, the access positions comprising access positions of each of the first and the second hand, the hands having a first and a second hand, the method comprising:

managing access positions of each of the first hand and the second hand, wherein an access order of the first hand is set to the access positions of the first hand and an access order of the second hand is set to the access positions of the second hand; and determining a movement path of the second hand based on one of the access positions of the first hand, wherein the access positions and the access order of one of the first and the second hand are determined based on the access positions and the access order of the other one of the first and the second hand.

* * * * *